United States Patent
Sato et al.

(10) Patent No.: US 10,007,078 B2
(45) Date of Patent: Jun. 26, 2018

(54) OPTICAL FIBER RIBBON

(71) Applicant: SUMITOMO ELECTRIC INDUSTRIES, LTD., Osaka-shi, Osaka (JP)

(72) Inventors: Toshihisa Sato, Yokohama (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/272,620

(22) Filed: Sep. 22, 2016

(65) Prior Publication Data

US 2017/0090135 A1   Mar. 30, 2017

(30) Foreign Application Priority Data

Sep. 25, 2015   (JP) .................................. 2015-188791

(51) Int. Cl.
*G02B 6/44*   (2006.01)

(52) U.S. Cl.
CPC ......... *G02B 6/4404* (2013.01); *G02B 6/4403* (2013.01); *G02B 6/4405* (2013.01); *G02B 6/4409* (2013.01)

(58) Field of Classification Search
None
See application file for complete search history.

(56) References Cited

U.S. PATENT DOCUMENTS

| | | | | |
|---|---|---|---|---|
| 6,528,553 B1* | 3/2003 | Komiya | ............. | C03C 25/1055 428/378 |
| 6,584,257 B1* | 6/2003 | Hurley | ................ | G02B 6/4471 385/109 |
| 8,548,294 B2* | 10/2013 | Toge | .................... | G02B 6/4403 385/114 |
| 2005/0013573 A1* | 1/2005 | Lochkovic | ........... | G02B 6/4402 385/128 |
| 2006/0237218 A1* | 10/2006 | Glew | ..................... | H01B 11/06 174/113 C |
| 2007/0081774 A1* | 4/2007 | Suzuki | ................. | G02B 6/4404 385/109 |
| 2014/0314382 A1* | 10/2014 | Sato | ..................... | G02B 6/4403 385/103 |

FOREIGN PATENT DOCUMENTS

| | | |
|---|---|---|
| JP | 2007-279226 A | 10/2007 |
| JP | 2013-182157 A | 9/2013 |
| JP | 2013-205501 A | 10/2013 |
| JP | 2014-016530 A | 1/2014 |
| JP | 2014-157382 A | 8/2014 |

* cited by examiner

*Primary Examiner* — Sung Pak
(74) *Attorney, Agent, or Firm* — Drinker Biddle & Reath LLP

(57) ABSTRACT

An optical fiber ribbon is disclosed. The optical fiber ribbon includes first and second optical fibers arranged in parallel, and at least one coupling member made of a resin material. The coupling member couples the first and second optical fibers by adhering the first and second optical fibers each other intermittently in a longitudinal direction of the first and second optical fibers. A breaking elongation of the resin material constituting the coupling member is equal to or more than 200% and equal to or less than 500%.

11 Claims, 5 Drawing Sheets

OPTICAL FIBER RIBBON

CROSS REFERENCE TO RELATED APPLICATIONS

This application is based upon and claims the benefit of priority from Japanese Patent Application No. 2015-188791, filed on Sep. 25, 2015; the entire contents of which are incorporated herein by reference.

TECHNICAL FIELD

The present invention relates to an optical fiber ribbon.

BACKGROUND

Japanese Unexamined Patent Publication Nos. JP2014-16530, JP2014-157382, JP2013-182157, JP2007-279226, and JP2013-205501 disclose optical fiber ribbons coupling a plurality of optical fibers each of which includes optical waveguides by means of a single core or two or more cores, which typically consist of a core and a cladding made of silica glass. In the optical fiber ribbons described in the these documents, a coupling member for coupling (adhering) the optical fibers adjacent to each other is intermittently arranged along a longitudinal direction of the optical fibers. JP2013-182157 further discloses that a tear strength of the coupling member is 1.5 to 21.0 gf (0.015 to 0.21 N) and a maximum thickness of the coupling member is 50 to 320 μm.

SUMMARY

When the coupling member of the adjacent optical fibers is arranged intermittently along the longitudinal direction of the optical fiber as described in the above documents, as an occupancy of the coupling members between the optical fibers is smaller, a flexibility of an optical fiber ribbon is more improved to facilitate handling thereof, but the joint strength between the adjacent optical fibers is lowered and will be likely to cause a break. In contract, when the occupancy of the coupling members in a gap between the optical fibers is larger, the joint strength between the optical fibers is increased but the flexibility of the optical fiber ribbon is lowered. Therefore, it is desired that the flexibility of the ribbon fiber and the joint strength between the optical fibers are made compatible with each other.

An optical fiber ribbon according to an embodiment of the present invention comprises first and second optical fibers arranged in parallel, and at least one coupling member made of a resin material coupling the first and second optical fibers by adhering the first and second optical fibers each other intermittently in a longitudinal direction of the first and second optical fibers. In the optical fiber ribbon, a breaking elongation of the resin material constituting the coupling member is equal to or more than 200% and equal to or less than 500%.

DETAILED DESCRIPTION

Figure 1:
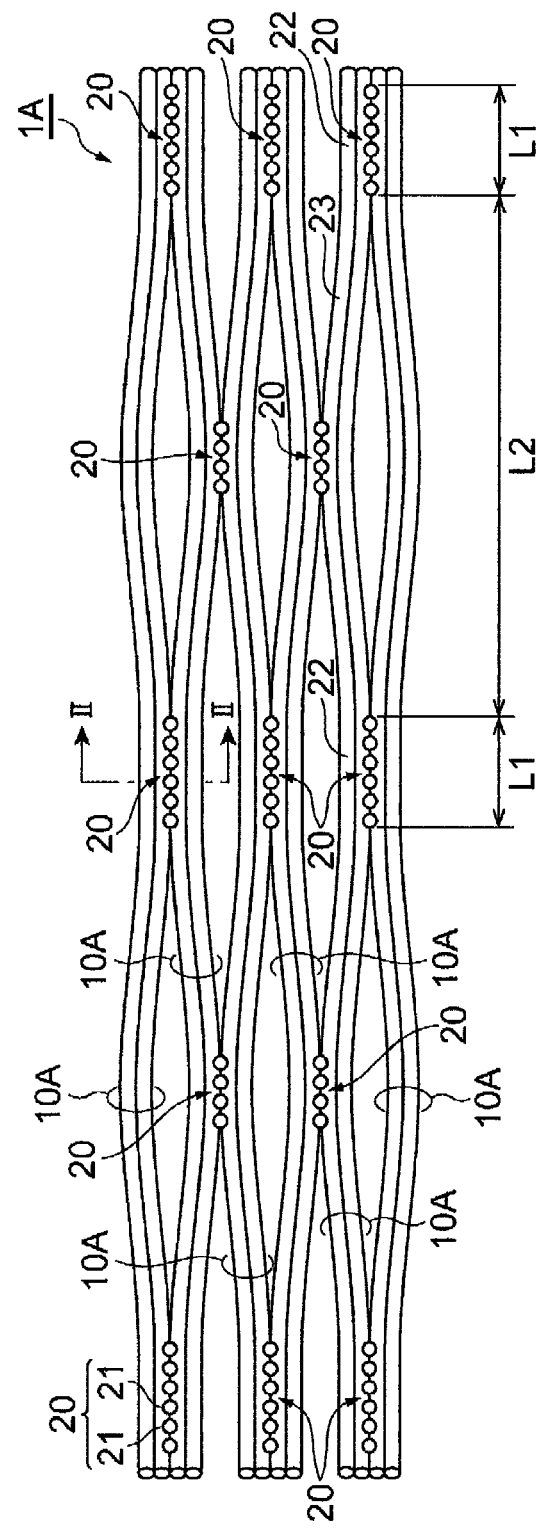
FIG. 1 is a plan view showing an outer appearance of an optical fiber ribbon according to an embodiment of the present invention.

[Description of the Embodiment of the Present Invention]

First, content of an embodiment of the present invention is described. (1) An optical fiber ribbon according to an embodiment of the present invention comprises a plurality of optical fibers arranged alongside in a direction crossing a longitudinal direction thereof, and a coupling member made of a resin material coupling the plurality of optical fibers by intermittently adhering the optical fibers adjacent to each other, in which a breaking elongation of the resin material constituting the coupling member is equal to or more than 200% and equal to or less than 500%.

In this embodiment, the breaking elongation of the resin material constituting the coupling member is equal to or more than 200% as described above, which allows the coupling member to preferably follow deformation caused by an external force and makes a break or peel-off at the coupling member unlikely to occur. In other words, according to the above optical fiber ribbon, it is possible to make a handling ability of the optical fiber ribbon compatible with the joint strength between the optical fibers at a higher level. In addition, if the breaking elongation of the resin material is equal to or less than 500%, the individual optical fibers can be easily separated by hand and it can be prevented that a part of the coupling member is left on a surface of the optical fiber when removing the coupling member.

(2) In the above optical fiber ribbon, a tear strength of the coupling member may be equal to or more than 0.25 N. This, even in a case where a plurality of optical fiber ribbons are housed in a single cable, for example, can efficiently reduce destruction of the optical fiber ribbon, that is, separation of the optical fiber, caused by the cable being bent.

(3) In the above optical fiber ribbon, a Young's modulus of the resin material constituting the coupling member may be equal to or less than 50 MPa. This can suppress the tear strength of the resin material constituting the coupling member to efficiently restrict loss variations in mid-span branching.

(4) In the above optical fiber ribbon, each of the plurality of optical fibers may have a single-core optical waveguide and a resin coating layer. The resin coating layer may include a primary resin layer contacting with an outer periphery of the optical waveguide, and a secondary resin layer which contacts with an outer periphery of the primary resin layer, has a Young's modulus higher than the primary resin layer, and is colored. The coupling member may contact with the secondary resin layer. In this way, each optical fiber having the colored secondary resin layer in place of a colored layer on the secondary resin layer allows a coloring process (colored layer forming process) to be omitted in manufacturing each optical fiber, reducing manufacturing processes. Moreover, the secondary resin layer and the coupling member directly contacting with each other without involving the colored layer allows a sticking force of them to be improved, further increasing the joint strength between the optical fibers.

(5) In the above optical fiber ribbon, each of the plurality of optical fibers may have an optical waveguide, a primary resin layer contacting with an outer periphery of the optical waveguide, a secondary resin layer which contacts with an outer periphery of the primary resin layer, has a Young's modulus higher than the primary resin layer, and is colored, and a collective covering layer contacting with an outer periphery of the secondary resin layer and collectively covering two or more cores optical waveguides. The coupling member may contact with the collective covering layer. In this way, each optical fiber having the colored secondary resin layer in place of a colored layer on the secondary resin layer allows a coloring process (colored layer forming process) to be omitted in manufacturing each optical fiber, reducing manufacturing processes. Furthermore, the secondary resin layer and the collective covering layer directly contacting with each other without involving the colored layer allows a sticking force of them to be improved to result in the improved sticking force between the secondary resin layer and the coupling member, further increasing the joint strength between the optical fibers.

[Detailed Description of The Embodiment of the Present Invention]

Specific examples of an optical fiber ribbon according to an embodiment of the invention are described below with reference to the drawings. Note that the invention is not limited to the examples, and is intended to be shown in the Claims and include all changes in the meanings and scope equivalent to the Claims. In the following description, the same components in description of the drawings are designated by the same reference signs, and the duplicated description is omitted.

Figure 2:
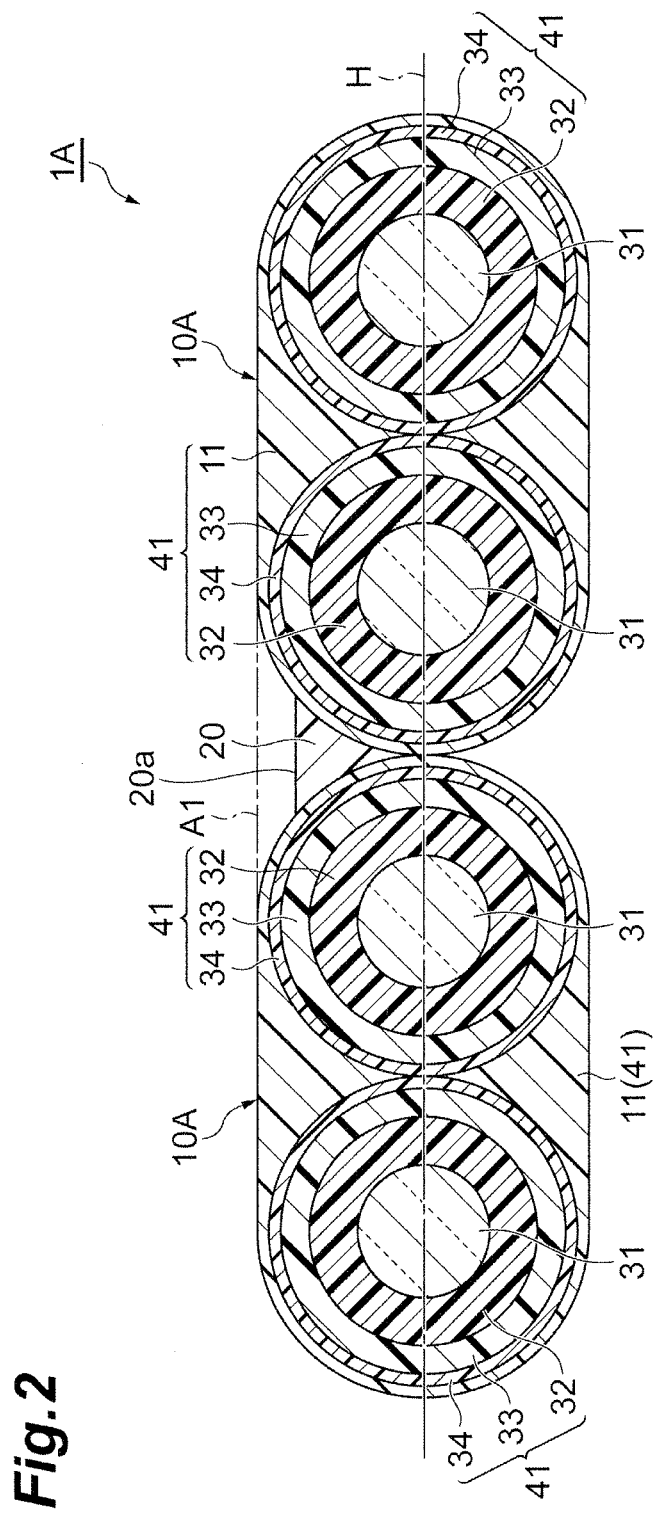
FIG. 2 is a cross-sectional view of the optical fiber ribbon taken along a line II-II shown in FIG. 1.

FIG. 1 is a plan view showing an outer appearance of an optical fiber ribbon according to an embodiment of the present invention. FIG. 2 is a cross-sectional view of the optical fiber ribbon taken along a line II-II shown in FIG. 1 and shows a view obtained by cutting a part of the optical fiber ribbon at a plane perpendicular to a central axis line.

As shown in FIG. 1, an optical fiber ribbon 1A according to the embodiment includes a plurality of optical fibers 10A and a plurality of coupling members 20. The plurality of optical fibers 10A is arranged alongside in a direction crossing a longitudinal direction of these. As an example, six optical fibers 10A are shown in FIG. 1. As shown in FIG. 2, each optical fiber 10A has two optical waveguides 31 and a resin coating layer 41 coating the optical waveguide 31. The optical waveguide 31 is constituted by a core guiding light and a cladding which has a lower refractive index than the core and covers the core. The core and the cladding are made of silica glass, for example. An outer diameter of the optical waveguide 31, that is, an outer diameter of the cladding, is 125 μm, for example.

The resin coating layer 41 includes a primary resin layer 32, a secondary resin layer 33, a colored layer 34, and a collective covering layer 11. The primary resin layer 32 contacts with an outer periphery of the optical waveguide 31, that is, an outer periphery of the cladding. The primary resin layer 32 is made of resin materials such as urethane acrylate or epoxy acrylate, for example, and a Young's modulus thereof is in a range from 0.1 MPa to 5 MPa, for example. A thickness of the primary resin layer 32 is 30 μm, for example. The secondary resin layer 33 is made of resin materials such as urethane acrylate or epoxy acrylate, for example, and contacts with an outer periphery of the primary resin layer 32. A Young's modulus of the secondary resin layer 33 is higher than that of the primary resin layer 32, and is in a range from 300 MPa to 1200 MPa, for example. A thickness of the secondary resin layer 33 is 30 μm, for example. The colored layer 34 is made of resin materials colored with a pigment such as urethane acrylate or epoxy acrylate, for example, and contacts with an outer periphery of the secondary resin layer 33. A thickness of the colored layer 34 is 5 μm, for example. The collective covering layer 11 is made of resin materials such as polyurethane acrylate for example, and contacts with the outer periphery of the colored layers 34. The collective covering layer 11 collectively covers two cores optical waveguides 31 to form an outermost layer of the optical fiber 10A.

The coupling member 20 is made of a resin material and intermittently arranged in the longitudinal direction of the optical fiber 10A. In an example, in the longitudinal direction of the optical fiber 10A, a connection region 22 (e.g., a length L1 of 30 mm) and a non-connection region 23 (e.g., a length L2 of 120 mm) are alternately located alongside, where a point-like coupling member 20 is intermittingly provided at the connection region 22. The length L1 of the connection region 22 may be less than the length L2 of the non-connection region 23. The coupling member 20 includes a plurality of glue drops 21, such as four or six glue drops 21. Each diameter of the glue drops 21 of the coupling member 20 is 0.2 to 0.3 mm, for example.

The coupling member 20 couples a plurality of optical fibers 10A to each other by intermittently adhering the optical fibers 10A adjacent to each other. The coupling member 20 according to the embodiment contacts with a surface of the collective covering layer 11. The coupling member 20 is made of resin materials such as an acrylic ultraviolet cure resin or an epoxy ultraviolet cure resin, for example, and a Young's modulus of the relevant resin material is in a range from 1 MPa to 50 MPa, for example. A breaking elongation of this resin material of the coupling member 20 is in a range of being equal to or more than 200% and equal to or less than 500% and a tear strength thereof is in a range of being equal to or more than 0.25 N and equal to or less than 1.00 N.

As shown in FIG. 2, the coupling member 20 is arranged only on one side of a plane H which includes centers of the optical waveguides 31. A height of a surface 20a of the coupling member 20 with reference to the plane H is lower than a height of a surface of the outermost layer, that is, the collective covering layer 11, with reference to the plane H. In other words, the coupling member 20 does not project outward from a straight line A1 connecting the surfaces of the collective covering layers 11 and the surface 20a of the coupling member 20 is recessed from the outermost layer of the optical fiber ribbon 1A.

Effects obtained from the optical fiber ribbon 1A having the above structure according to the embodiment are described. The present inventors focused attention on characteristics of the coupling member 20 in order to improve the joint strength between the optical fibers 10A while maintaining the handling ability of the optical fiber ribbon 1A. If the coupling member 20 is made hard in order to increase the joint strength, a flexibility of the optical fiber ribbon 1A is impaired. Therefore, the present inventors used the relatively flexible resin material for the coupling member 20 and employed the larger elongation in deformation to try to make the flexibility of the optical fiber ribbon 1A compatible with the joint strength between the optical fibers 10A. As a result, as shown in an example described later, they have found that if the breaking elongation of the resin material constituting the coupling member 20 is equal to or more than 200%, the desired characteristics can be obtained that the coupling member 20 preferably follows the deformation caused by the external force and a break or peel-off at the coupling member 20 is unlikely to occur. In other words, according to the optical fiber ribbon 1A of the embodiment, it is possible to make the handling ability of the optical fiber ribbon 1A compatible with the joint strength between the optical fibers 10A at a higher level. Although ease of separation of the individual optical fibers 10A is also required from the view point of workability, if the breaking elongation of the resin material of the coupling member 20 is equal to or less than 500%, the individual optical fibers 10A can be easily separated by hand and it can be prevented that a part of the coupling member 20 is left on a surface of the optical fiber 10A when removing the coupling member 20.

Additionally, in the optical fiber ribbon 1A according to the embodiment, the tear strength of the resin material constituting of the coupling member 20 may be equal to or more than 0.25 N. This, even in a case where a plurality of optical fiber ribbons 1A are housed in a single cable, for example, can efficiently reduce destruction of the ribbon of fibers 1A, that is, separation of the optical fiber 10A, caused by the cable being bent.

Furthermore, in the optical fiber ribbons 1A according to the embodiment, the Young's modulus of the resin material constituting of the coupling member 20 may be equal to or less than 50 MPa. This can suppress the tear strength of the resin material constituting the coupling member 20 to efficiently restrict the loss variations in mid-span branching.

As in the embodiment, the height of the surface 20a of the coupling member 20 with reference to the plane H which includes the centers of the optical waveguides 31 may be lower than the height of the surface of the outermost layer with reference to the plane H. This, even in a case where a plurality of optical fiber ribbon 1A is layered, for example, prevents the coupling members 20 of the optical fiber ribbons 1A from being frictioned with each other to be damaged, suppressing reduction of the joint strength. According to the optical fiber ribbon 1A of the embodiment, even in a case where the coupling member 20 is made thin like this, it is possible to preferably make the flexibility of the optical fiber ribbon 1A compatible with the joint strength between the optical fibers 10A.

(First Modification Example)

Figure 3:
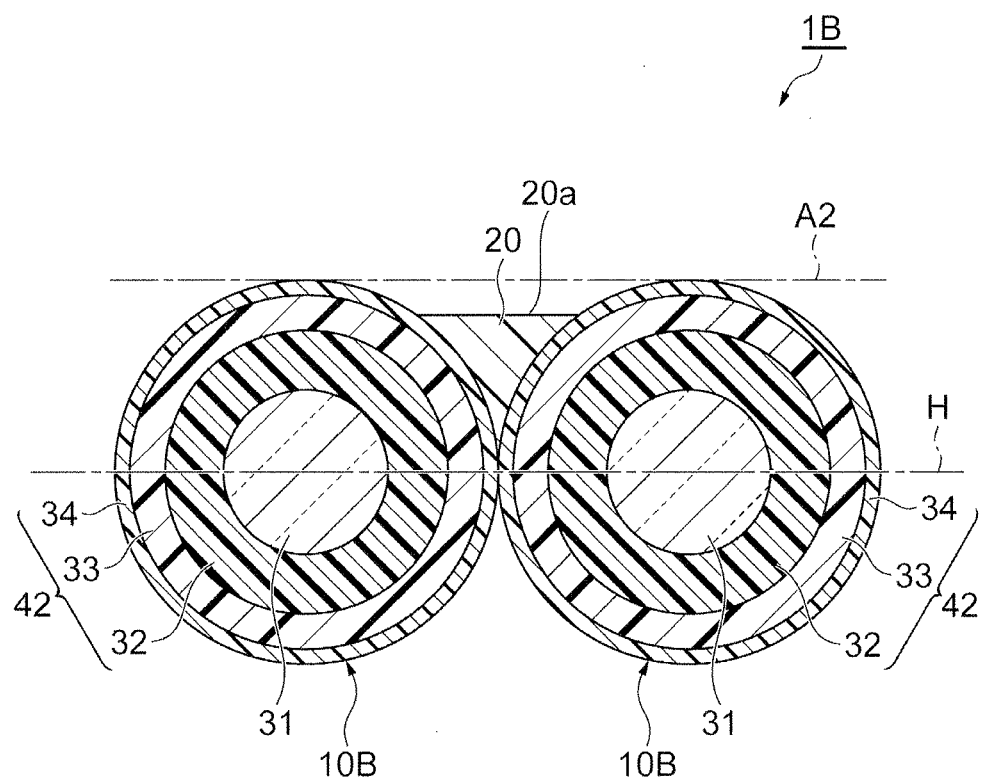
FIG. 3 is a cross-sectional view of an optical fiber ribbon partially enlarged according to a first modification example.

Here, a first modification example of the above embodiment is described. FIG. 3 is a cross-sectional view of an optical fiber ribbon 1B partially enlarged according to the modification example, and shows a cross section perpendicular to a longitudinal direction of the optical fiber ribbon 1B. In this optical fiber ribbon 1B, a difference from the optical fiber ribbon 1A in the above embodiment is a structure of an optical fiber 10B. In other words, the optical fiber 10B according to the embodiment has a single core (one) optical waveguide 31 and a resin coating layer 42 coating the optical waveguide 31.

The resin coating layer 42 includes the primary resin layer 32, the secondary resin layer 33, and the colored layer 34, but does not include the collective covering layer 11 of the above embodiment because the optical waveguide 31 is the single core. Therefore, an outermost layer of the optical fiber 10B is the colored layer 34, and the coupling member 20 contacts with each of the colored layer 34.

The structure of the coupling member 20 is similar to that in the above embodiment. However, as shown in FIG. 3, the height of the surface 20a of the coupling member 20 with reference to the plane H which includes the centers of the optical waveguides 31 is lower than the height of the surface of the outermost layer, that is, the colored layer 34 with reference to the plane H. That is to say, the coupling member 20 does not project outward from a straight line A2 connecting the surfaces of the colored layers 34.

In the first modification example, the coupling member 20 having the characteristics similar to the above embodiment makes it possible to make a flexibility of the optical fiber ribbon 1B compatible with a joint strength between the optical fibers 10B at a higher level. At the same time, the individual optical fibers 10B can be easily separated by hand and it can be prevented that a part of the coupling member 20 is left on a surface of the optical fiber 10B when removing the coupling member 20.

(Second Modification Example)

Figure 4:
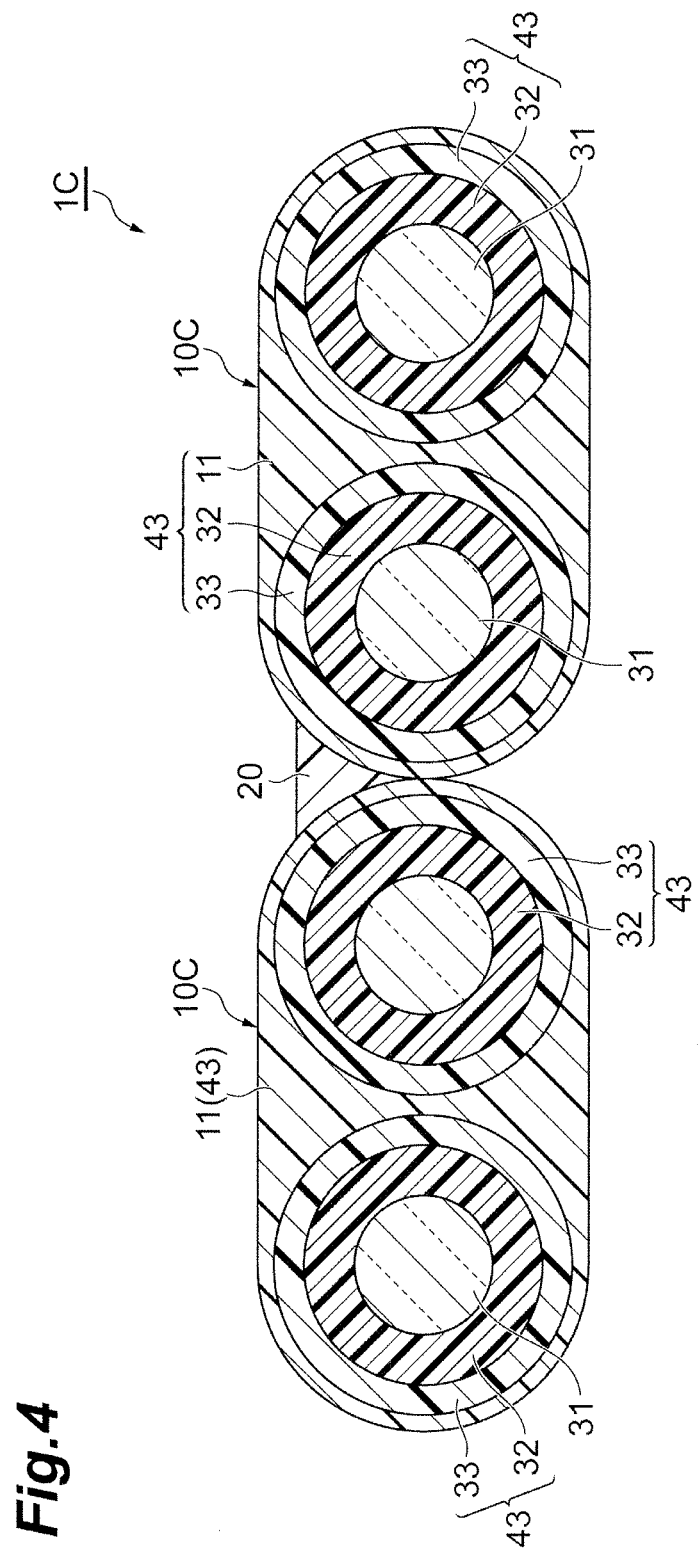
FIG. 4 is a cross-sectional view of an optical fiber ribbon partially enlarged according to a second modification example.

FIG. 4 is a cross-sectional view of an optical fiber ribbon 1C partially enlarged according to a second modification example, and shows a cross section perpendicular to a longitudinal direction of the optical fiber ribbon 1C. Each of a plurality of optical fibers 10C included in the optical fiber ribbon 1C is different from the above embodiment, that is, a resin covering layer 43 does not have the colored layer. Instead, the secondary resin layer 33 is colored with a pigment. Then, the collective covering layer 11 contacts with the secondary resin layer 33.

Even in the structure as in the second modification example, effects similar the above embodiment can be obtained. Moreover, each optical fiber 10C having the colored secondary resin layer 33 in place of the colored layer on the secondary resin layer 33 allows a coloring process (colored layer forming process) to be omitted in manufacturing each optical fiber 10C, reducing the manufacturing processes. Furthermore, the secondary resin layer 33 and the collective covering layer 11 directly contacting with each other without involving the colored layer allows a sticking force of them to be improved.

(Third Modification Example)

Figure 5:
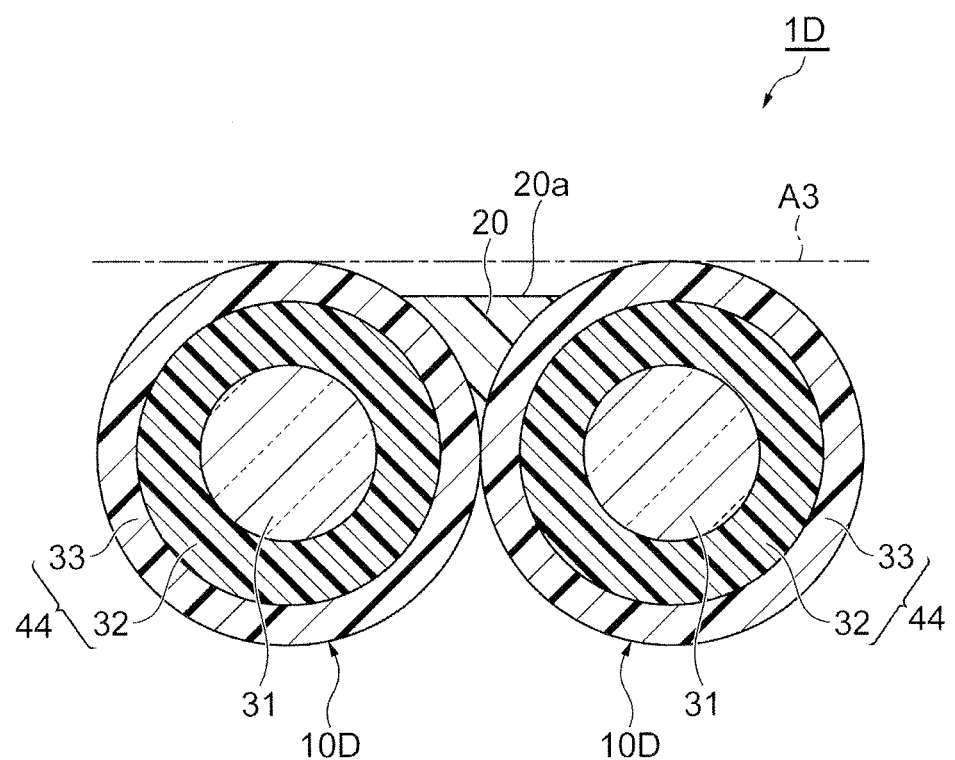
FIG. 5 is a cross-sectional view of an optical fiber ribbon partially enlarged according to a third modification example.

FIG. 5 is a cross-sectional view of an optical fiber ribbon 1D partially enlarged according to a third modification example, and shows a cross section perpendicular to a longitudinal direction of the optical fiber ribbon 1D. Each of a plurality of optical fibers 10D included in the optical fiber ribbon 1D includes the single-core optical waveguide 31 and a resin coating layer 44 coating the optical waveguide 31. The resin coating layer 44 includes the primary resin layer 32 and the secondary resin layer 33, but does not include the colored layer 34. Additionally, the resin coating layer 44 does not include the collective covering layer 11 because the optical waveguide 31 is the single core. Therefore, an outermost layer of the optical fiber 10D is the secondary resin layer 33, and the coupling member 20 contacts with the secondary resin layer 33.

The structure of the coupling member 20 is similar to that in the above embodiment. However, as shown in FIG. 5, the height of the surface 20a of the coupling member 20 with reference to a plane which includes the centers of the optical waveguides 31 is lower than the height of the surface of the outermost layer, that is, the secondary resin layer 33, with reference to the plane. That is to say, the coupling member 20 does not project outward from a straight line A3 connecting the surfaces of the secondary resin layers 33.

Even in the structure as in the third modification example, effects similar the above embodiment can be obtained. Moreover, each optical fiber 10D having the colored secondary resin layer 33 in place of the colored layer on the secondary resin layer 33 allows a coloring process (colored layer forming process) to be omitted in manufacturing each optical fiber 10D, reducing the manufacturing processes. Furthermore, the secondary resin layer 33 and the coupling member 20 directly contacting with each other without involving the colored layer allows a sticking force of them to be improved, further increasing a joint strength between the optical fibers 10D.

(Example)

The optical fiber ribbon 1A in the above embodiment was produced, and results of examination of the characteristics thereof are described. In the example, first, the optical waveguide 31 having an outer diameter of 125 μm was coated by the primary resin layer 32 having a thickness of 30 μM, the secondary resin layer 33 having a thickness of 27.5 μm, and the colored layer 34 having a thickness of 5 μm. Then, two optical waveguides 31 were covered outside the colored layer 34 by the collective covering layer 11 to produce the optical fiber 10A. Two optical fibers 10A thus produced were located in parallel and the resin material to be the coupling members 20 was intermittently arranged using a dispenser to produce the optical fiber ribbon 1A.

At this time, as the resin material of the coupling member 20, used were five kinds of acrylic ultraviolet cure resins different from each other in a tensile breaking elongation, such as 50%, 200%, 250%, 500%, 800%. Note that the breaking elongation was adjusted by changing the number of functional groups of monomer. The breaking elongation is larger as a contribution of a density of crosslinking points is smaller. The breaking elongation can be increased by increasing monofunctional monomers, and can be decreased by increasing multifunctional monomers or increasing the number of the functional groups.

Then, five kinds of optical fiber ribbons 1A different in the breaking elongation of the coupling member 20 were subjected to a torsion test defined by the IEC60794-1-2 and a separation test (a test in which the optical fibers are manually separated from the optical fiber ribbon to remove the coupling members). Table 1 shows results of those. Note that in the torsion test, "A" shows a success case where the optical fiber ribbon looses when the number of torsions each of which is 180° is more than four and eight or less times, "B" shows a failure case where the optical fiber ribbon looses when the number of torsions each of which is 180° is four or less times. In the separation test, "A" shows a success case where the coupling member 20 can be completely removed from all of five optical fiber ribbons 1A which have the same breaking elongation of the coupling member 20, and "B" shows a failure case where a part of the coupling member 20 is left in one optical fiber ribbon 1A of the relevant five ribbons. The breaking elongation was measured using a No. 2 test piece based on the JIS K 7113. A thickness of the test piece was 100 μm, a gauge length was 25 mm, and a test speed was 50 mm/min. An average value when N=5 was found.

TABLE 1

| Breaking elongation | Torsion test | Separation test |
| --- | --- | --- |
| 50% | B | A |
| 200% | A | A |
| 250% | A | A |
| 500% | A | A |
| 800% | A | B |

As shown by test results in Table 1, if the breaking elongation of the coupling member 20 was equal to or more than 200%, the results of the torsion test were good. In other words, it was found that if the breaking elongation of the resin material constituting the coupling member 20 is equal to or more than 200%, the coupling member 20 preferably follows the deformation caused by the external force and the break or peel-off at the coupling member 20 is unlikely to occur. In addition, if the breaking elongation of the coupling member 20 was equal to or less than 500%, the results of the separation test were good. In other words, it was found that if the breaking elongation of the resin material of the coupling member 20 is equal to or less than 500%, the optical fiber ribbon 1A can be easily separated by hand into the individual optical fibers 10A and it can be prevented that a part of the coupling member 20 is left on a surface of the optical fiber 10A in removing the coupling member 20.

Next, four kinds of optical fiber ribbons 1A were produced which were different from each other in the sticking force of the coupling member 20 with respect to the outermost layer of the optical fiber 10A. Note that the sticking force of the coupling member 20 was adjusted changing a viscoelastic property by adding a coupling agent or changing a molecular weight distribution. Then, these optical fiber ribbons 1A were subjected to a tearing test defined by the IEC60794-1-2-34. At that time, an average value of tear strengths obtained by tearing the coupling members 20 at ten points was used as a measurement value. The breaking elongation of these coupling members was from 200% to 500%.

The above four kinds of optical fiber ribbons 1A were examined for ease of destruction when being housed in a cable. Specifically, 50 optical fiber ribbons 1A were bundled and covered by a sheath made of polyethylene including a pair of tensile strength members to form one cable. Then, this cable was subjected to an ironing test defined by the IEC60794-1-2 under conditions of a tension 130 kg, a mandrel radius 250 mm, and a bending angle 90 degrees. After the test, the cable was broken down to confirm whether or not the optical fibers 10A were separated, that is, whether or not the coupling member 20 was destructed. If all coupling members were not lost, success "A" was determined, and if even one coupling member was lost, a failure "B" was determined.

Table 2 shows the tear strengths and results of the ironing test of four kinds of optical fiber ribbons 1A.

TABLE 2

| Tear strength | Destruction in cable |
| --- | --- |
| 0.10 N | B |
| 0.25 N | A |
| 0.50 N | A |
| 1.0 N | A |

As shown by the test results in Table 2, it was found that if the tear strength of the coupling member 20 is equal to or more than 0.25 N, the destruction of the coupling member 20 in the cable can be effectively suppressed.

The optical fiber ribbon according to the present invention is not limited to the above embodiment and can be variously modified in other ways. For example, the above embodiment and modification examples described above may be combined with each other depending on required object and effect. In addition, the above embodiment and the modification examples show the cases where the optical fiber has the two cores optical waveguides (in the embodiment and the second modification example), and where the optical fiber has the single-core optical waveguide (in the first modification example and third modification example), but the optical fiber may have three or more cores optical waveguides in the invention.

What is claimed is:

1. An optical fiber ribbon comprising:
   first and second optical fibers arranged in parallel; and
   at least one coupling member made of a resin material coupling the first and second optical fibers by adhering the first and second optical fibers each other intermittently in a longitudinal direction of the first and second optical fibers,
   wherein a breaking elongation of the resin material constituting the coupling member is equal to or more than 200% and equal to or less than 500%,
   wherein a tear strength of the coupling member is equal to or more than 0.25 N,
   wherein the tear strength of the coupling member is equal to or less than 1.00 N, and
   the tear strength is measured in accordance with IEC60794-1-2.

2. The optical fiber ribbon according to claim 1, wherein a Young's modulus of the resin material constituting the coupling member is equal to or less than 50 MPa.

3. The optical fiber ribbon according to claim 2, wherein the Young's modulus of the resin material is equal to or more than 1 MPa.

4. The optical fiber ribbon according to claim 1, wherein a surface of the coupling member is recessed from an outermost layer of the optical fiber ribbon.

5. The optical fiber ribbon according to claim 1, wherein the coupling member includes a plurality of glue drops.

6. The optical fiber ribbon according to claim 5, wherein a diameter of each of the plurality of glue drops is between 0.2 mm and 0.3 mm.

7. The optical fiber ribbon according to claim 1, wherein a connection region where the first and second optical fibers are connected each other by the coupling member and a non-connection region where the first and second optical fibers are not connected each other are alternately located in the longitudinal direction of the first and second optical fiber.

8. The optical fiber ribbon according to claim 7, wherein a length of the connection region is less than that of the non-connection region.

9. The optical fiber ribbon according to claim 1, wherein the coupling member is arranged only on one side of a plane including centers of the first and second optical fibers.

10. The optical fiber ribbon according to claim 1, wherein
    each of the first and second optical fibers comprises a single-core optical waveguide and a resin coating layer,
    the resin coating layer includes
       a primary resin layer contacting with an outer periphery of the optical waveguide, and
       a secondary resin layer which contacts with an outer periphery of the primary resin layer, has a Young's modulus higher than the primary resin layer, and is colored, and
    the coupling member contacts with the secondary resin layer.

11. The optical fiber ribbon according to claim 1, wherein
    each of the first and second optical fibers comprises:
       first and second optical waveguides;
       a first primary resin layer contacting with an outer periphery of the first optical waveguide;
       a first secondary resin layer which contacts with an outer periphery of the first primary resin layer, has a Young's modulus higher than the first primary resin layer, and is colored;
       a second primary resin layer contacting with an outer periphery of the second optical waveguide;
       a second secondary resin layer which contacts with an outer periphery of the second primary resin layer, has a Young's modulus higher than the second primary resin layer, and is colored; and
       a collective covering layer contacting with an outer periphery of the first and second secondary resin layers and collectively covering the first and second optical waveguides, and
    the coupling member contacts with the collective covering layer.

* * * * *